April 21, 1970 — E. N. ANDREWS — 3,507,508
TOOLHOLDER BUSHING
Filed July 24, 1968 — 2 Sheets-Sheet 1
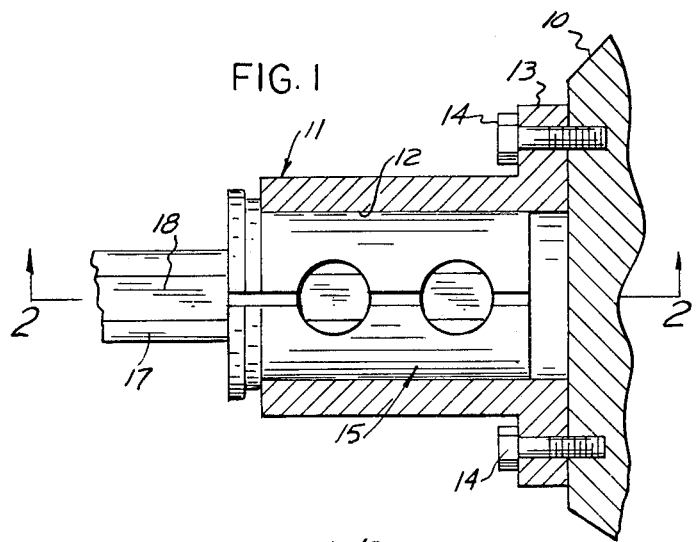
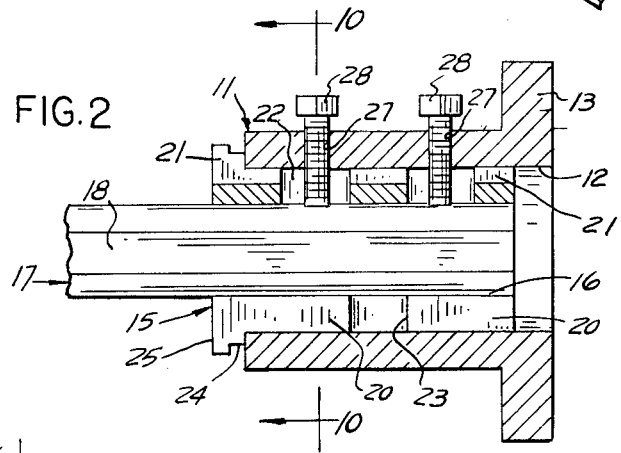
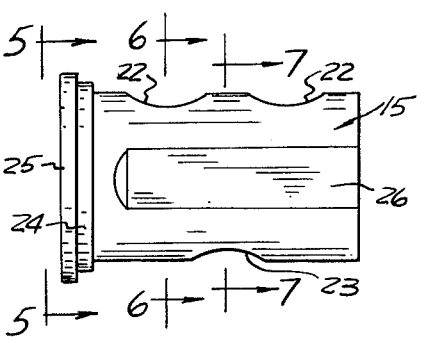
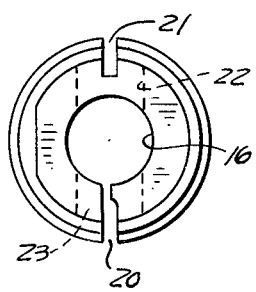
INVENTOR
EDWARD N. ANDREWS
BY Cullen, Sloman, & Cantor
ATTORNEYS April 21, 1970   E. N. ANDREWS   3,507,508
TOOLHOLDER BUSHING Filed July 24, 1968   2 Sheets-Sheet 2

INVENTOR
EDWARD N. ANDREWS
BY Cullen, Sloman, & Cantor
ATTORNEYS

United States Patent Office 3,507,508
Patented Apr. 21, 1970

3,507,508
TOOLHOLDER BUSHING
Edward N. Andrews, Troy, Mich.
(400–80 W. Nine Mile Road, Hazel Park, Mich. 48030)
Filed July 24, 1968, Ser. No. 747,292
Int. Cl. B23b 5/34
U.S. Cl. 279—83     5 Claims

ABSTRACT OF THE DISCLOSURE

A longitudinally slit, cylindrically shaped tube, having radial holes in its wall opposite the slit, for receiving a tool shank and fitting within a socket, so that set screws secured to the socket and extended through the holes to bear upon the tool shank cause the wall areas adjacent the slit to wedge against the socket for immovably fastening together the tool shank, bushing and socket.

BACKGROUND OF INVENTION

In machine tools, such as turret lathes and the like, it is customary to provide one or more sockets or sleeves to receive and support the shanks of tools used on the machine. For example, on a turret lathe, the head or turret may be provided with a number of such sockets, each receiving the shank or end of a tool such as a boring bar or drill, etc.

Since the sleeve or socket is of a fixed size, whereas different size tools may be used, it is customary to provide some sort of bushing to fit within the socket and in turn have an internal opening of a size to fit and receive the particular tool then being used.

In this type of construction, it is necessary to fix the tool against rotation within the bushing and to fix the bushing against rotation within the sleeve. That is, it is necessary to immovably, but temporarily connect the tool shank, bushing and sleeve or socket against relative rotation due to high torques.

Conventionally available bushings generally are locked within the socket by means of set screws, with the tool shank locked within the bushing also by set screws. However, the conventional construction requires a number of set screws for this purpose and these are not always adequate, particularly after some wear, to fix the parts against relative rotation.

Hence, it is an object of this invention to provide a specific form of bushing which will lock in place against rotation relative to the socket.

SUMMARY OF INVENTION

An object of this invention is to provide a tool holder bushing in the form of a split tube for snug insertion within a machine tool socket, within which bushing the tool shank may be inserted and wherein set screws used for locking the tool shank in place also tend to force the bushing to spring radially outwardly to thereby wedge against the socket for immovably locking the three elements together.

Summarizing, the invention contemplates a bushing in the form of a cylindrical tube having a longitudinal slit and an opposing longitudinal groove, wherein the bushing may be sprung apart at the slit to outwardly press against and wedge against the machine tool socket within which it is located, due to the pressure of set screws engaging the tool shank located within the bushing.

Further objects and advantages of this invention will become apparent upon reading the following description, of which the attached drawings form a part.

DESCRIPTION OF DRAWINGS

FIG. 1 is a top, plan view, partially in cross-section, showing a portion of a turret lathe head within whose socket the bushing of this invention is positioned.

FIG. 2 is a cross-sectional view, in elevation, taken as if in the direction of arrows 2—2 of FIG. 1.

FIG. 3 is an elevational view of the bushing per se, and

FIG. 4 is an end view of the bushing of FIG. 3.

DETAILED DESCRIPTION

Figure 5:
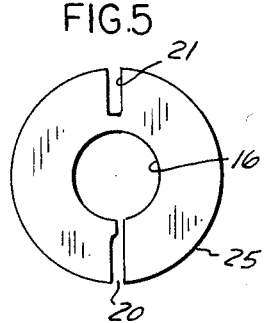
FIGS. 5, 6 and 7, are each views taken in the direction of the respective arrows 5—5, 6—6 and 7—7 of FIG. 3.
Figure 6:
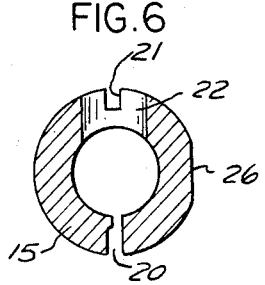
Figure 7:
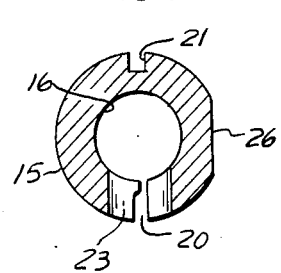
Figure 8:
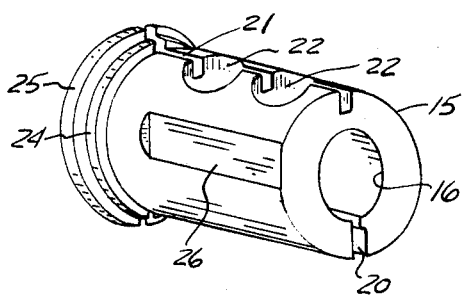
FIG. 8 is a perspective view of the bushing.
Figure 9:
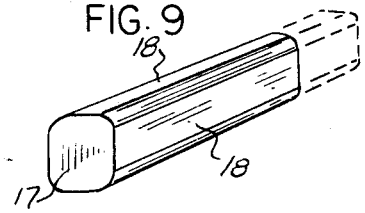
FIG. 9 is a perspective view of a typical tool shank, such as the shank of a boring bar.

FIG. 1 illustrates in cross-section, a fragment of the turret or head 10 of a typical turret lathe to which is fastened a flanged holder or sleeve 11 having an internal opening forming a socket 12. Such holder is formed with an external flange 13 which is fastened by suitable bolts or screws 14 to the head 10.

Fitted within the socket 12 is the bushing 15 which has a central tool receiving opening 16 for closely receiving the shank 17 of a typical tool, such as a boring bar or drill or the like. Conventionally such shanks are formed with one or more flats 18 extending their length.

The bushing 15 is formed of a cylindrically shaped tube made of a springy metal and is provided with a longitudinally extending slit 20 which extends its full length. Diametrically opposite to the slit, in the same plane, is formed an outwardly opening groove 21. Radially directed openings 22, centered on the groove, are formed through the tube wall and preferably at least one opening 23 may be formed on the opposite side of the tube, centered on the slit. The outer end of the bushing is formed in a stepped flange arrangement, namely, an inner abutment flange 24 adapted to abut the free end of the flanged holder or sleeve 11, and an outer flange, of larger diameter, which outer flange 25 is formed for gripping the bushing and removing it from the sleeve.

Also a flat 26 is ground upon one side of the sleeve, preferably in an area located at 90° from the slit.

Figure 10:
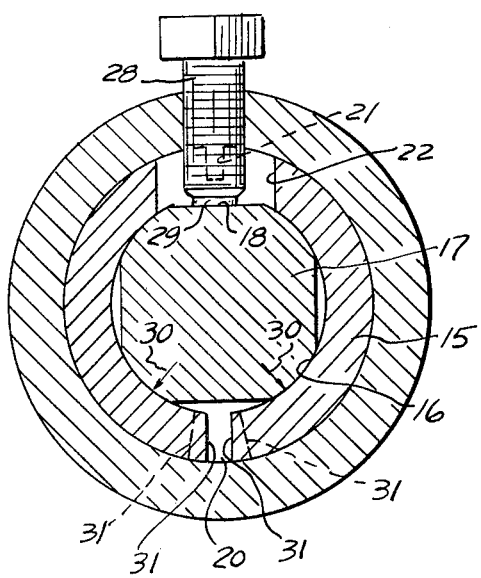
FIG. 10 is an enlarged, cross-sectional view taken in the direction of arrows 10—10 of FIG. 2.

As illustrated in FIGS. 2 and 10, threaded holes 27 are formed in the sleeve to receive and threadedly engage set screws 28, whose lower ends 29 bear against one of the flats 18 of the tool shank.

Operation

In operation, the machine tool operator, after having selected a particular size tool with a known size tool shank, selects a bushing 15 having a central tool receiving opening 16 corresponding to the size of the shank and then positions the bushing within the socket 12, as illustrated in FIGS. 1 and 2. The bushing snugly fits within the socket, but at this point, with sufficient torque it may be turned.

Next, the tool shank 17 is inserted within the bushing and the set screws 28 are tightened to radially inwardly press against the shank. Referring to FIG. 10, the set screw pressure causes the tool shank to press, as schematically illustrated by the arrows 30, against the bushing so that the edges 31 of the slit tend to spring apart, as illustrated in exaggerated fashion by dotted lines, thereby tightly wedging the bushing against the socket 12. This action frictionally locks together the three elements, namely, the sleeve, bushing and tool. The groove in this case, functions as a hinge line to assist in the spreading apart of the tube wall.

Modifications

Figure 11:
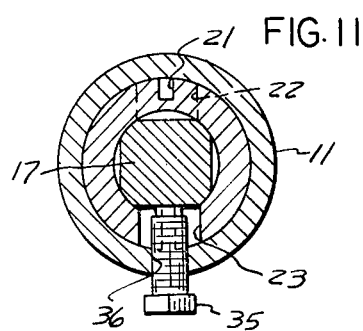
FIG. 11 is a view similar to FIG. 10, but to a reduced scale, showing a modified form of mounting.

In certain types of work, it is necessary to engage the tool from the opposite direction. Hence, referring to FIG. 11, a lower set screw 35, threadedly engaged with a threaded opening 36 formed in the sleeve 11, is arranged to engage the tool from the slit side of the bushing, by passing through the lower opening 23. Here, the tool is pressed towards the groove but the pressure of the tool, coupled with the effect of the groove, tends to spread or move apart the tube walls in the slit area to thereby frictionally lock together in the manner described in connection with FIG. 10.

Figure 12:
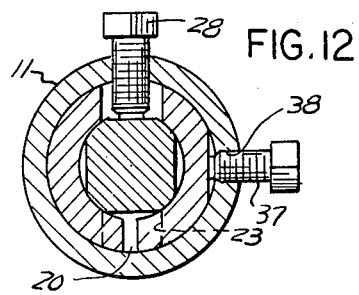
FIG. 12 shows a second modification.

FIG. 12 illustrates a further modification wherein a side set screw 37, threadedly engaged with a threaded opening 38, formed in the sleeve, may be used either alone or in conjunction with the set screw 28. The side set screw engages the flat 26 formed on the bushing and tends to compress or squeeze together the bushing around the tool as well as to hold the bushing against rotation.

This invention may be further developed within the scope of the following claims. Accordingly, it is desired that the foregoing description be read as being merely illustrative of an operative embodiment of this invention, and not in a strictly limited sense.

Having fully described an operative embodiment of this invention, I now claim:

1. A toolholder bushing for securing a tool shank within the tool holding socket of a machine tool, comprising:
    a cylindrically shaped tube of an outside diameter for snugly fitting within a similarly shaped socket, and of an inside diameter to closely receive the shank of a tool to be fastened within the socket;
    the tube being longitudinally slit for its full length and a longitudinal groove formed in the outer wall and extending the full length of the tube along a line diametrically opposite to and in the plane of the slit, with the tube being relatively springy for radially outwardly directed movement of the tube wall in the area of the slit;
    and at least one radially directed opening formed through the tube wall and centered upon the groove for providing a set screw passageway;
    whereby a set screw mounted upon the socket may loosely pass radially inwardly through said opening for engaging and pressing radially inwardly against a tool shank arranged within the tube for thereby slightly spring expanding the tube wall at the slit radially outwardly for frictionally immovably locking the shank within the tube and the tube within the socket.

2. A bushing as defined in claim 1, and including a continuous flat formed upon the outer wall of the tube along a radial plane arranged approximately perpendicular to the plane of the slit and groove for engagement with a set screw for holding and compressing the tube within the socket.

3. A bushing as defined in claim 2, and said tube having an inner end for fitting within the socket and an outer end extending slightly outwardly of the socket;
    said outer end being formed as an inner, continuous, radially outwardly directed flange for abutting the end of the socket and an outer, continuous radially outwardly directed gripping flange of a greater diameter than the inner flange for gripping and pulling the bushing out of the socket.

4. A bushing as defined in claim 1, and including a second opening formed through the tube and centered upon the slit, whereby an alternative set screw mounted upon the socket may loosely pass radially inwardly through said second opening and press against the shank to press the shank towards the groove and thereby radially expand the tube at the slit for frictionally locking the shank, tube and socket together.

5. A tool holder for machine tools comprising:
    a sleeve having an internal tool receiving socket;
    a cylindrically shaped tubular bushing having an outer diameter of approximately the same size and shape as the socket, the bushing being snugly fitted within said socket;
    the wall of said bushing being longitudinally slit along its full length and having an outwardly opening groove longitudinally extending its full length in the plane of, but diametrically opposite to, said slit;
    at least one enlarged opening extending through the bushing wall and centered upon the groove;
    a radially inwardly directed set screw threadedly engaged with a correspondingly threaded hole formed in the sleeve and loosely passing through said bushing wall opening;
    a tool having a shank closely fitted in and extending through said bushing and said set screw pressing radially inwardly against said shank, whereby said bushing is radially sprung slightly outwardly at the slit for frictionally locking the tool shank within the bushing and the bushing within the socket.

References Cited

UNITED STATES PATENTS

| | | | |
|---|---|---|---|
| 413,641 | 8/1889 | Babbitt | 287—52.08 XR |
| 2,503,860 | 4/1950 | Williams | 287—52.06 |

FOREIGN PATENTS

| | | |
|---|---|---|
| 143,122 | 1920 | Great Britain. |

ROBERT C. RIORDON, Primary Examiner

D. D. EVENSON, Assistant Examiner

U.S. Cl. X.R.

287—52.04, 52.08